United States Patent
Wanesky

[15] 3,680,947
[45] Aug. 1, 1972

[54] MICROSCOPE APPARATUS WITH MOVABLE FLUID BEARING OBJECT SUPPORT

[72] Inventor: William R. Wanesky, Wescosville, Pa.

[73] Assignee: Western Electric Company Incorporated, New York, N.Y.

[22] Filed: April 21, 1970

[21] Appl. No.: 30,379

[52] U.S. Cl. ..................350/81, 350/86, 350/90, 308/9
[51] Int. Cl. ............................................G02b 21/26
[58] Field of Search ..........350/81, 86, 90, 91; 308/5, 308/9, DIG. 1; 324/158 F, 158 T

[56] References Cited

UNITED STATES PATENTS

| | | | |
|---|---|---|---|
| 2,869,933 | 1/1959 | Bissinger | 308/9 X |
| 3,155,383 | 11/1964 | Whitmore | 308/9 X |
| 3,226,810 | 1/1966 | Beliveau | 324/158 T X |
| 3,281,692 | 10/1966 | Beroset | 324/158 |
| 3,388,848 | 6/1968 | Youmans et al. | 228/1 |
| 3,357,091 | 12/1967 | Reissmueller et al. | 350/81 X |

FOREIGN PATENTS OR APPLICATIONS 1,300,879  10/1969  Germany ........................308/5

*Primary Examiner*—David H. Rubin
*Attorney*—W. M. Kain, R. P. Miller and R. Y. Peters

[57] ABSTRACT

Microscopic insertion of objects such as beam-lead integrated circuits is accomplished by positioning the objects mounted on platforms in a spaced relationship under a vacuum pickup needle located in the field of view of the microscope. Rapid and accurate positioning is aided by air bearing facilities. One of the platforms includes a transparent disc for supporting the bottom sides of the objects. The disc is parallel to and spaced from a mirror which reflects an image of the bottom sides to the microscope. The microscope is first raised to its upper position along its principal axis and focused on the top sides of the objects so that the mirror image of the bottom sides is out of focus and not visible. The top sides are then individually inspected. Next, the microscope is moved to its lower position along its axis and then focused on the mirror image of the bottom sides of the objects so that the top sides are out of focus. Preferably, the magnification of the microscope while in its lower position is increased to provide a larger image of the bottom sides to thereby facilitate their inspection. The increasing of the magnification also decreases the depth of field of the microscope so that an image of the top sides is far out of focus and therefore not visible. This improves the clarity of the image of the bottom sides to further facilitate their inspection. The bottom sides are then individually inspected. During the inspection the objects are separated in accordance with certain characteristics with the aid of a vacuum pickup needle. The movement of the needle is limited by a ball plunger to prevent damage to the objects.

4 Claims, 9 Drawing Figures

PATENTED AUG 1 1972

INVENTOR
W.R. WANESKY

BY R.Y. Peters
ATTORNEY

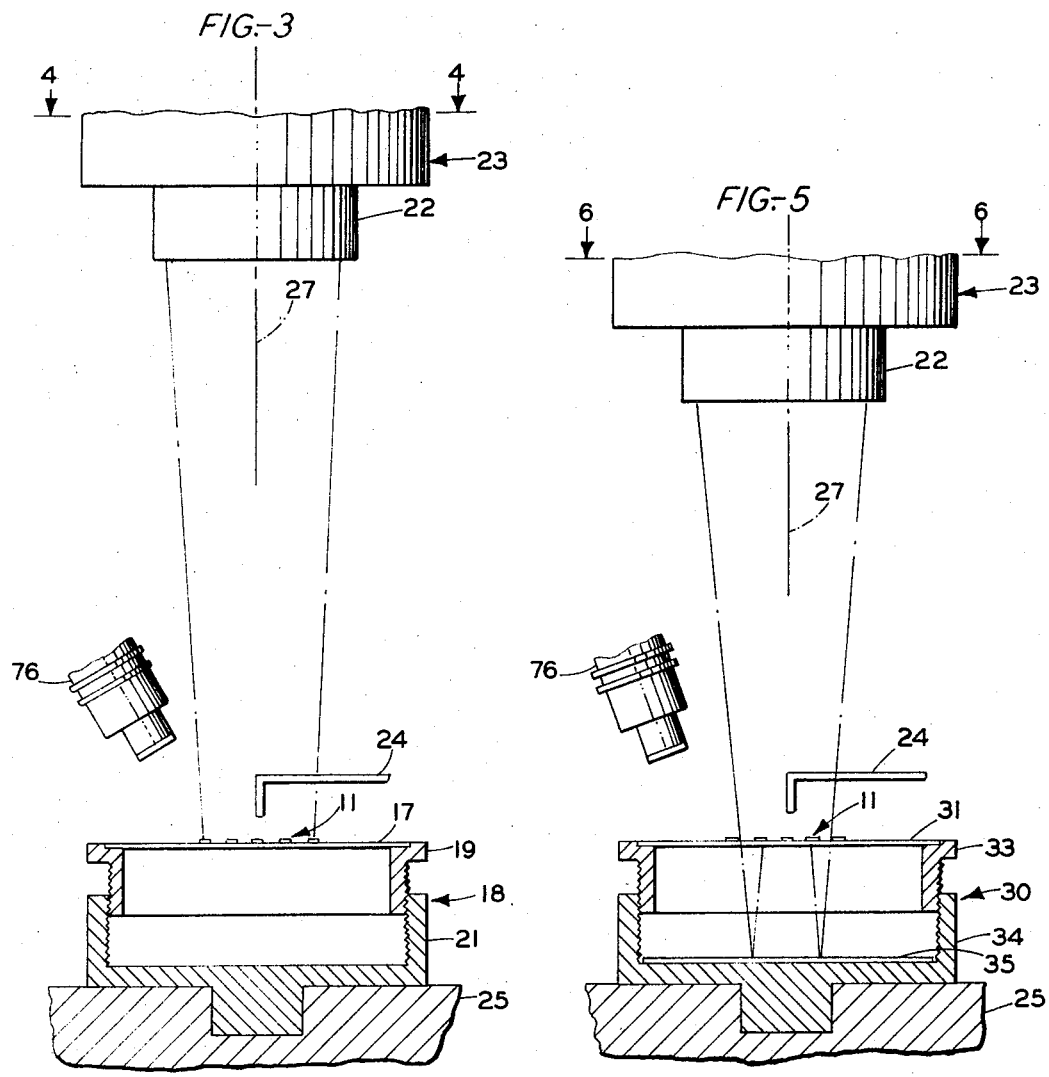

MICROSCOPE APPARATUS WITH MOVABLE FLUID BEARING OBJECT SUPPORT

BACKGROUND OF THE INVENTION

1. Field

This invention relates to methods of and apparatus for microscopically inspecting objects and more particularly to methods of and apparatus for individually inspecting a plurality of beam-lead integrated circuits and separating them in accordance with certain characteristics.

2. Prior Art

This invention is particularly suited for use in the manufacture of small, fragile objects such as semiconductor devices or the like. An example of such a semiconductor device which is extremely small and fragile is the so-called beam-lead integrated circuit, such as disclosed in M. P. Lepselter U.S. Pats. Nos. 3,287,612; 3,335,338 and 3,426,252.

While the invention is adapted to be used in conjunction with inspecting any small objects, it will be particularly described with respect to beam-lead integrated circuits. A beam-lead integrated circuit includes a semiconductor body with interconnected circuit element inseparably associated on or within such body. Leads are bonded to the body as an integral part of the device and extend from the body like cantilever beams to form both electrical and mechanical connections to a header or a circuit pattern formed on a substrate.

In the manufacture of beam-lead integrated circuits, it is necessary to inspect both sides of the circuits with a microscope to separate the defective devices from the good ones.

In the past much difficulty was experienced in positioning the circuits under a vacuum pickup needle located in the field of view of the microscope. Usually the circuits were supported on a platform slidably mounted on a base and when the operator attempted to move the circuits under the pickup needle, he would frequently undershoot or overshoot the needle. This undershooting or overshooting was exaggerated by the magnification of the microscope. As a result, much time was consumed in eventually positioning the circuits, and therefore in inspecting the circuits.

Also, much time was consumed in inspecting both the active sides as well as the inactive sides of the circuits. Either the circuits had to be manually turned over to inspect the active sides or a mirror had to be arranged beneath the circuits and the microscope had to be tilted about its axis to inspect such active sides. Further, these prior techniques permitted the inspection of only one circuit at a time with separate handling steps between each inspection. Moreover, these techniques had the disadvantage of not being readily adaptable to the rapid inspection of an array of a large number of the circuits.

Further, difficulty had been experienced in handling the circuits due to their smallness in size and their fragility. For example, a slight pressure on the beam leads may bend them so as to make the circuits unusable in subsequent manufacturing operations. Also, excessive pressures on the semiconductor bodies of the circuits may crush them or otherwise damage them.

SUMMARY OF THE INVENTION

It is, therefore, an objective of this invention to provide new and improved methods of and apparatus for inspecting a plurality of microscopic objects.

Another objective of this invention is the provision of air bearing facilities for the rapid and accurate positioning of the objects under a vacuum pickup needle located in the field of view of a microscope.

A further objective of this invention is to provide an arrangement of a microscope and a mirror located beneath an array of objects to be inspected, wherein the microscope has an upper position along its principal axis for the inspection of the top sides of the objects and a lower position along such axis for the inspection of reflected images of the bottom sides of the objects.

With these and other objectives in view, the present invention contemplates a new and improved apparatus for inspection of a plurality of objects. The apparatus includes a base and a microscope mounted to the base. Platforms mounted to a slide plate are provided for supporting the objects to be inspected and positioning them in the field of view of the microscope. A plurality of air conducting expediants are provided for supplying a pressurized fluid between the base and the slide plate to float the plate out of contact with the base on a substantially frictionless fluid film, thereby facilitating the precise positioning of the objects under the microscope.

This invention also contemplates a method of inspecting an object which includes the steps of supporting the object with its top side facing a microscope having a principal axis and an upper and a lower position aligned along such axis, and with the bottom side of the object on a transparent member spaced from a reflective surface to reflect an image of such bottom side to the microscope. The microscope is raised to its upper position and focused on the top side of the object so that the reflected image of the bottom side is out of focus. The top side is then inspected. Next, the microscope is moved to its lower position and the microscope is focused on the reflected image of the bottom side of the object so that its top side is out of focus, and such bottom side is then inspected.

BRIEF DESCRIPTION OF THE DRAWINGS

Other objects and advantages of the present invention may be more clearly understood by reference to the following detailed description and the accompanying drawings, wherein:

FIG. 3 is a cross-sectional view taken along line 3—3 of FIG. 2, illustrating the microscope in its upper position for individually inspecting the inactive sides of the beam-lead integrated circuits;

FIG. 4 is an enlarged top view taken along line 4—4 of FIG. 3, showing the inactive sides of the circuits with identifying marks;

FIG. 5 is a cross-sectional view taken along line 5—5 of FIG. 2, illustrating the microscope in its lower position for individually inspecting the active sides of the beam-lead integrated circuits;

FIG. 6 is an enlarged top view taken along line 6—6 of FIG. 5, showing the active sides of the circuit in a highly magnified state;

DETAILED DESCRIPTION

Figure 1:
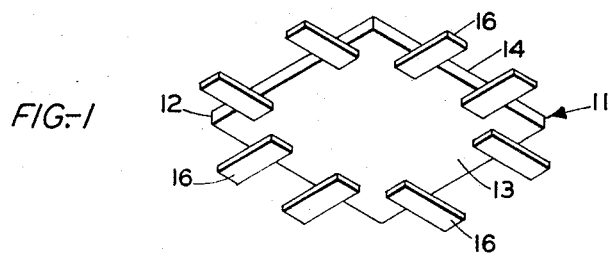
FIG. 1 is a greatly enlarged, perspective view of a beam-lead integrated circuit which is to be inspected in accordance with the present invention.

Referring now to the drawings, and in particular to FIG. 1, there is shown an object to be inspected which may be a beam-lead integrated circuit, designated generally by the numeral 11. Such circuit 11 includes a semiconductor body 12 having a bottom or active side 13 and a top or inactive side 14, and a plurality of beam leads 16 extending from the active side 13 of the body 12.

Typically, the integrated circuit 11 is very minute, the semiconductor body 12 having a square shape, about 15 to 90 mils wide and about only 2 mils thick, while the leads 16 are about 9 mils long and 3 mils wide. Usually, the body 12 is made of silicon and the leads 16 are made of gold. Extremely minute interconnected circuit elements (not shown), usually in the form of gold plated patterns, are formed on the active side 13 of the integrated circuits 11. These patterns, the leads 16, the bodies 12 and the active and inactive sides 13 and 14 are to be visually inspected for defects and accordingly sorted by the apparatus and methods of the present invention.

The integrated circuits 11 are removably supported on a carrier member or disc 17 (FIGS. 2 and 3) of a first platform, designated generally by the numeral 18, with the inactive sides 14 facing up. While the disc 17 may be either transparent or opaque, as a matter of convenience the disc 17 is formed from a flat sheet of glass and its top surface may be covered with a layer of pressure sensitive, vacuum holding material, such as a silicone resin of the general type sold by the Dow Corning Corporation under the trade designation "Sylgard 182." (See co-pending patent application, Ser. No. 729,859, filed Apr. 10, 1968, now U.S. Pat. No. 3,632,074 issued Jan. 4, 1972, by W. R. Wanesky, assignor to the Western Electric Company, Incorporated.)

The carrier disc 17 is fixed to a first retainer 19 which is threaded into a second retainer 21 so that the distance of the integrated circuits 11 to a vacuum pickup needle 24 is adjustable simply by rotating the retainer 19 relative to the retainer 21. The vacuum pickup needle 24 is located under an objective lens 22 of a microscope 23.

The second retainer 21 is rotatably mounted on a slide plate 25 so that an operator can angularly move the integrated circuits 11 relative to the objective lens 22. The slide plate 25 is movably mounted on a base 26 spaced from the microscope 23 and perpendicular to its principal axis 27. The slide plate 25 is used by the operator to position the circuits 11 supported on the disc 17 in the field of view of the objective lens 22 of the microscope 23.

The microscope 23, which is used to visually inspect the integrated circuits 11, may be any standard commercial microscope of the type having an objective lens with a diameter substantially larger than the integrated circuits to be inspected. Preferably, the microscope 23 has an adjustable magnification and is movable along its principal axis 27 to an upper and a lower aligned position. As an alternative to being movable to such upper and lower positions, the microscope 23 may be fixed on its axis 27 and facilities may be provided for moving the integrated circuits 11 to an upper and a lower aligned position under the microscope 23. Advantageously, the microscope 23 is of the type sold by the American Optical Corporation under the trade designation "Cycloptic Series 53" which has a working distance (object to objective lens) of about four inches and an adjustable magnification of 10X to 40X.

In a typical example of rapidly and accurately inspecting the inactive sides 14 in accordance with this invention (1) the bodies 12 of the circuits 11 are square shaped and have sides measuring approximately 50 mils, (2) the microscope 23 is in its upper position and has about a 4-inch working distance and 10X magnification, and (3) the circuits 11 are located about 4 inches from the lens 22.

The microscope 23 is mounted to the base 26 by conventional attaching means. Such microscope 23 has a first knob 28 for controlling its magnification and a second knob 29 for moving it along its principal axis 27 to its upper position as shown in FIG. 3 and to its lower position as shown in FIG. 5. The knob 29 is also used to focus the microscope 23 in these positions.

Figure 2:
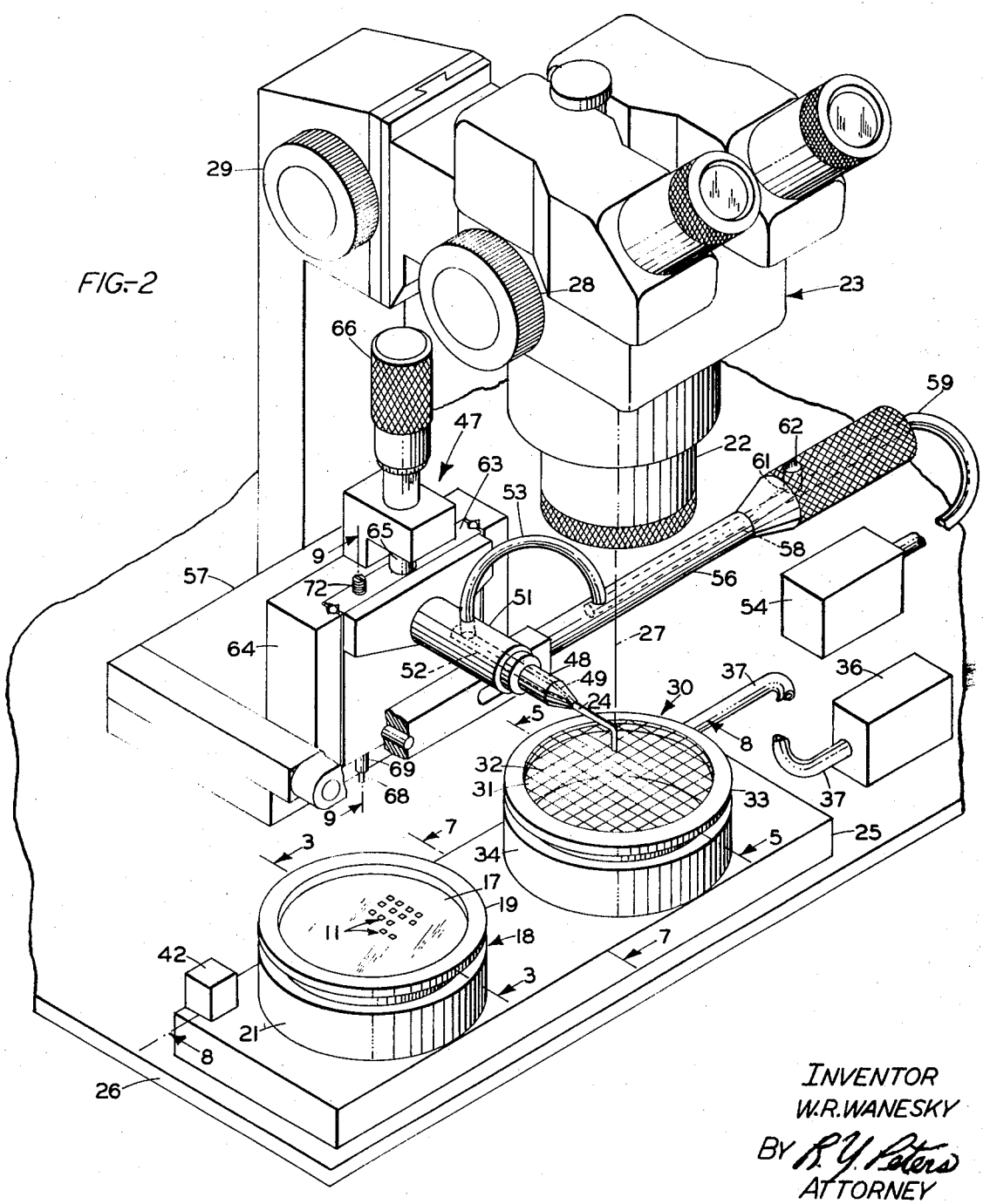
FIG. 2 is a perspective view of an apparatus for individually inspecting with a microscope both the active and inactive sides of a plurality of beam-lead integrated circuits.

A second platform, designated generally by the numeral 30, is also mounted to the slide plate 25 and is spaced a macroscopic distance from the first platform 13, as shown in FIG. 2. The platform 30 includes a transparent carrier member or disc 31, FIGS. 2 and 5, for removably supporting the integrated circuits 11 in a spaced relationship with their inactive sides 14 facing up. Preferably, the disc 31 is formed from a flat sheet of glass and its top surface is covered with a transparent layer of the aforementioned pressure sensitive, vacuum holding material. Also, the disc 31 preferably has a grid 32 formed thereon to aid the operator in positioning the integrated circuits 11 on the carrier disc 31 in a spaced relationship as shown in FIGS. 2, 5 and 6.

The carrier disc 31 is fixed to a third retainer 33 which is threaded into a fourth retainer 34 so that the distance of the integrated circuits 11 to the vacuum pickup needle 24 is adjustable simply by rotating the retainer 33 relative to the retainer 34. The retainer 34 is rotatably mounted to the slide plate 25 so that the operator can angularly adjust the circuits 11 relative to the objective lens 22. The slide plate 25 is also used by the operator to position the integrated circuits 11 supported on the disc 31 under the needle 24 located in the field of view of the objective lens 22.

A mirror 35 is located within the retainer 34 beneath and parallel to the carrier disc 31. The mirror 35 reflects images of the active sides 13 of the integrated circuits 11 to the microscope 23. Advantageously, the mirror 35 is formed from a flat, highly polished silicon slice which has the appearance of a black mirror and provides excellent contrast for the viewing of the gold leads 16.

The mirror 35 permits the active sides 13 of the integrated circuits 11 to be individually inspected by the operator with the microscope 23 simply by rotating the knob 29. This moves the microscope 23 to its lower position along its principal axis 27, as shown in FIG. 5, and permits the focusing of it on the mirror images of such active sides 13. With the microscope 23 in this position, its magnification is preferably greatly increased to provide a larger image of the active sides 13 and thereby facilitate their inspection. This increasing the magnification also decreases the depth of field of the microscope 23 so that the inactive sides 14 are far out of focus and therefore not visible. This improves the clarity of the image of the active sides 13. In effect, the sides 14 merely decrease some of the light entering the objective lens 22. In other words, when the operator is looking through the microscope 23, he is looking through the space between the circuits 11.

In a typical example of inspecting the active sides 13 in accordance with this invention, (1) the bodies 12 of the circuits 11 are square shaped and have sides measuring approximately 50 mils, (2) the microscope 23 is in its lower position and has about a 4-inch working distance and a 40X magnification, (3) the circuits 11 are located about 3 inches from the lens 22, (4) the mirror 35 is located about one-half inch from the disc 31, and (5) the circuits 11 are centered inside the squares formed by the grid 32 which has openings measuring approximately 100 mils.

By the use of this arrangement, both the active and inactive sides 13 and 14 of the circuits 11 can be inspected without manually turning the circuits 11 over and without tilting the microscope 23. Thus, the operator can rapidly and accurately inspect a large array of the circuits 11.

Air bearing facilities are provided to minimize the differences between the static and sliding friction of the slide plate 25 on the base 26. Such facilities enable the operator, taking hold of the left end of the plate 25, to overcome the problem of undershooting or overshooting the vacuum pickup needle 24 in the process of positioning the integrated circuits 11 under such needle 24. Unwanted rotational movement of the plate 25 is also reduced. These problems are particularly troublesome when viewing the circuits 11 with the microscope 23 because small movements are greatly exaggerated by the magnification of such microscope 23. By overcoming these problems the operator can move the slide plate 25 both macroscopic and microscopic distances. The microscopic distances may be as small as about 1 mil. As a result the operator can rapidly and accurately position the integrated circuits 11 beneath the vacuum pickup needle 24 and, therefore, rapidly and accurately inspect large quantities of the integrated circuits 11.

Figure 7:
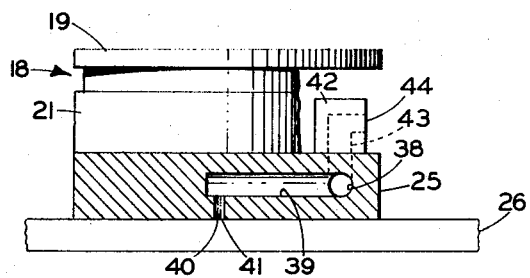
FIG. 7 is a cross-sectional view taken along line 7—7 of FIG. 2, illustrating air bearing facilities in their non-effective state.
Figure 8:
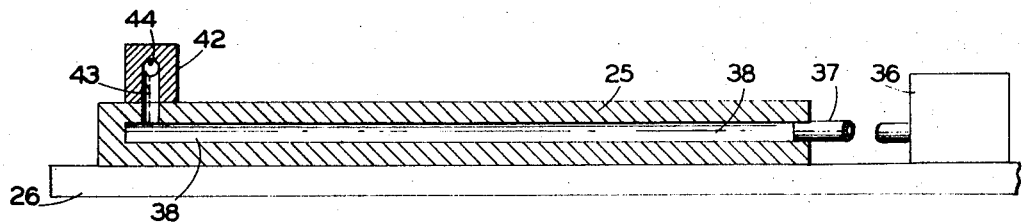
FIG. 8 is a cross-sectional view taken along line 8—8 of FIG. 2, illustrating the passageways of the air bearing facility.

The air bearing facilities include a source of air under pressure connected by a flexible tube 37 to a longitudinally extending passageway 38, FIG. 8, in the slide plate 25. The passageway 38 communicates with a laterally extending passageway 39, FIG. 7, which in turn communicates with a vertical passageway 40, one end of which forms an aperture 41 in the bottom of the plate 25.

A housing 42, FIGS. 2 and 8, is fixed to the left end of the slide plate 25 and has a passageway 43, FIG. 8, formed therein, one end of which communicates with the other end of the longitudinal passageway 38 and the other end of which forms a port 44 in the housing 42.

The port 44 is selectively blockable by the operator to force the air from the source 36 out of the aperture 40 in the bottom of the plate 25 to thereby float the plate 25 out of contact with the base 26 on a substantially frictionless air film. With the plate 25 so floating, the operator can controllably move it very minute distances to very rapidly and therefore accurately position the integrated circuits 11 under the vacuum pickup needle 24. Also, the operator can control the amount of friction between the slide plate 25 and the base 26 by partially blocking the port 44 to thereby provide greater control over the movement of the plate 25 on the base 26.

The vacuum pickup needle 24 is mounted to the base 26 for movement substantially perpendicular to the integrated circuits 11 on carrier discs 17 and 30 so that such needle 24 can be used to pick up the circuits 11. Such mounting of the needle 24 is accomplished with a standard commercial micropositioner, designated generally by the numeral 47. Advantageously, the micropositioner 47 may be of the type designated Model F and manufactured by the Line Tool Company of Allentown, Pennsylvania.

The micropositioner 47 includes a chuck 48 for removably holding the needle 24 and for providing a passageway 49 communicating with that of the needle 24. The needle 24 is preferably coated with a flat black paint to render it unobtrusive and to prevent glare when viewed simultaneously with the integrated circuits 11 through the microscope 23. Also, when the circuits 11 are viewed, the needle 24 is out of focus and therefore does not interfere with the inspection of the circuits 11.

The chuck 48 is fixed to a housing 51 which also has a passageway 52 communicating with the passageway 49 of the chuck 48. One end of a tube 53 for providing a vacuum from the source 54 to the needle 24 is fixed to the housing 51 in communication with the passageway 52 therein. The other end of the tube 53 is fixed to a handle 56 pivotally mounted to a base plate 57 for moving the needle 24 substantially perpendicular to the integrated circuits 11 on the platforms 18 and 30. The base plate 57 is fixed to the base 26.

The handle 56 has a first passageway 58, one end of which communicates with that of the tube 53 and the other end of which communicates with that of another tube 59 connected to the vacuum source 54. Intersecting the passageway 58 is a second passageway 61 in the handle 56. The second passageway 61 has a port 62 on the top surface of the handle 56, over which the operator can place his finger to control the vacuum at the free end of the needle 24 to pick up the integrated circuits 11. (For a similar device having a port which is selectively coverable to apply a vacuum to a needle to pick up semiconductors, see in J. E. Beroset U.S. Pat. No. 3,281,692.) If the operator quickly uncovers the ports 62, the rushing in of air to the needle 24 produces a puff of air at the free end of the needle 24, thereby ejecting a circuit 11 that may stick to the needle 24.

The housing 51 is fixed to a slide 63 of the micropositioner 47 which is mounted on linear slide bearings for vertical movement in a retaining plate 64 fixed to the base plate 57. A stop 65 is mounted to the retaining plate 64 for limiting the upper movement of the slide 63. The vertical position of the stop 65 is adjustable by a micrometer head 66.

Figure 9:
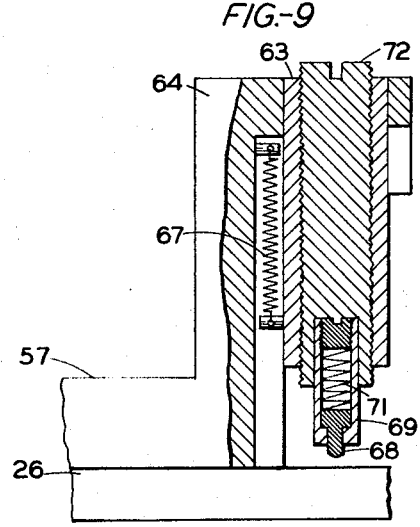
FIG. 9 is a cross-sectional view taken along line 9—9 of FIG. 2, showing the ball plunger arrangement.

A tension spring 67, FIG. 9, connected to the slide 63 and the retaining plate 64 normally holds the slide 63 up against the stop 65 and the handle 56 in its upper position, as shown in FIG. 2.

A ball plunger 68, FIGS. 2 and 9, mounted in a housing 69 threaded into the slide 63 is normally urged downward, as shown in FIG. 2, by a compression spring 71. The extension of the plunger 68 is adjustable by a set screw 72 threaded in the slide 63. The ball plunger 68 limits the downward motion of the handle 56 so that when the needle 24 is positioned over the integrated circuits 11, the end of the needle 24 does not strike and, as a result, does not damage the circuit 11. This limiting action on the handle 56 is particularly important, because the operator in viewing the circuits 11 is looking straight down, perpendicular to the circuits 11 and parallel to the working end of the needle 24, and therefore cannot see such end approach the circuits 11. The limiting action is also particularly important when the operator is viewing the active sides 13 of the circuits 11 because the free end of the needle 24 is completely invisible, as shown in FIG. 6. Hence, the feel of the ball plunger 68 striking the base 26 is an indication to the operator that the end of the needle 24 is very close to the circuit 11 and that any additional movement of the needle 24 must be slight so as not to damage the circuits 11.

A spot illuminator 76 is mounted adjacent the microscope 23 and its light beam is reflected off the mirror 35 and onto the active sides 13 of the integrated circuits 11. The illuminator 76 aids in providing a bright, clear and easily inspected image of the active sides 13 of the circuits 11 by eliminating a hazy image of the opposite inactive sides 14, apparently caused by incident light reflections off of such inactive sides 14 which are face up on the carrier disc 31. The incident angle of the light beam is relatively shallow (less than about 45°) so that the light beam reflected off the mirror 35 does not enter the objective lens 22 of the microscope.

OPERATION

While the slide plate 25 rests on the base 26, air from the source 36 passes through the tube 37, the passageways 38 and 43 and out of the port 44. To inspect the integrated circuits 11 in accordance with the present invention, the operator takes hold of the slide plate 25 with his left hand (not shown) and places his finger over and blocks the port 44. The blocking of the port 44 forces the air from the passageway 38 through passageways 39 and 40 and out of the aperture 41 in the bottom of the slide plate 25. As a result, the slide plate 25 floats out of contact with the base 26 on a substantially frictionless air film to permit carefully controllable sliding movement of the plate 25 macroscopic and microscope distances.

The operator then moves the slide plate 25 to position the integrated circuits 11 supported on the disc 17 of the first platform 18 under the vacuum pickup needle 24 and in the field of view the objective lens 22 of the microscope 23. Initially, it is assumed that the microscope 23 is in its upper position along its principal axis 27, as shown in FIG. 3 and that its magnification is 10X to provide a large field of view. After so moving the first platform 18, the operator looks through the microscope 23 and individually inspects the inactive sides 14 of the integrated circuits 11.

At this time, the operator views the integrated circuits 11 in the arrangement shown in FIG. 4 and performs a first visual inspection of the circuits 11. As he views the circuits 11, he sees that some of them have and some do not have ink dots 77 thereon. The ink dots 77 indicate that the circuits 11 are defective as a result of previous tests. Such defective circuits 11 are not further inspected and are simply left resting on the carrier disc 17 of the first platform 18.

On the other hand, the inactive sides 14 of the circuits 11 not having the ink dots 77 thereon are further inspected through the microscope 23 for any mechanical defects, such as cracks in the silicon body 12, under or over etching and leads 16 that are bent.

If a particular circuit 11 does not have ink dots 77 thereon and passes the first inspection, the operator takes hold of the handle 56 with his right hand (not shown) and places his finger over the port 62 to produce a vacuum from the source 54 at the free end of the needle 24.

The operator then depresses the handle 56 moving the needle 24 toward the circuit 11, until the ball plunger 68 strikes the base 26. The increased pressure on the handle 56 due to the ball plunger 68 striking the base 26 indicates to the operator that the needle 24 is very close to the circuits 11 and that any additional pressure on the handle must be carefully applied so as not to apply excessive pressure to the circuits 11 and thereby damage them. The vacuum from the needle 24 should draw up the circuit 11 thereto. However, if this does not happen, the operator places a slightly increased pressure on the handle 56 pushing the ball plunger 68 against its compression spring 71 thereby moving the needle 24 even closer to, but still not in contact with, the circuit 11 to draw it up to the needle 24.

Next, the operator while still looking through the microscope 23, while still holding the slide plate 25 with his left hand and while still blocking the ports 44 and 62, moves the slide plate 25 to position the transparent carrier disc 31 of the second platform 30 in the field of view of the microscope 23. The operator then carefully moves the slide plate 25 in very small increments until the circuit 11 held by the needle 24 is precisely centered inside a square of the grid 32.

After this centering, the operator quickly uncovers the port 62, permitting air to rush into the needle 24. This produces a puff at the free end of the needle 24 which ejects the circuit 11 onto the carrier disc 31 of this second platform 30. At this time, the operator releases the handle 56 allowing it to return to its upperward position as shown in FIG. 2.

Then, the operator rotates the knob to increase the magnification of the microscope 23 to 40X and performs a second inspection of the same inactive side 14 of the deposited circuit 11 for the aforementioned mechanical defects. The higher magnification facilitates the finding of these defects. The higher magnification also decreases the depth of field of the microscope 23.

Next, the operator rotates the knob 29 to move the microscope 23 to its lower position along its axis 27, as shown in FIG. 5, and he focuses the microscope 23 on the image reflected by the mirror 35 of the active side 13 of the circuit 11 being inspected. This places the inactive side 14 outside of the now decreased depth of field of the microscope 23 and renders the side 14 invisible.

At this time, the operator performs a third visual inspection of the circuit 11, but this time of the more critical active side 13 rather than the inactive side 14. The operator again looks for the aforementioned mechanical defects. Since he is now viewing the circuit elements of the side 13, he also looks for smeared elements (usually in the form of gold), foreign particles, and under and over etching of such elements.

If the integrated circuit 11 undergoing inspection is found to be satisfactory, it is simply left on the carrier disc 31. However, if the circuit 11 fails to pass the third inspection, it is removed from the carrier disc 31 of the second platform 30 and replaced on the carrier disc 17 of the first platform 18.

It should be noted that the first inspection can be eliminated and the operator can simply perform all the other inspections of the integrated circuits 11 on the second platform 30.

While the invention has been described in connection with the inspection of a plurality of microscopic objects such as the beam-lead integrated circuits 11, it should be understood that the invention may be also used to inspect a single object, including its top and bottom sides.

What is claimed is:

1. Apparatus for rapid microscopic inspection of a plurality of objects, which comprises:
    a base;
    a microscope mounted to the base;
    means movably mounted on and in contact with an adjacent planar surface of the base for supporting and positioning the objects in the field of view of the microscope;
    fluid supply means for supplying a pressurized fluid between the base and the supporting and positioning means to float such means out of contact with the base on a substantially frictionless fluid film,
    the supporting and positioning means being freely movable in any lateral direction and capable of floating out of contact with the adjacent planar surface of the base;
    the supporting and positioning means being formed with a fluid passageway having a first port which is normally covered by the adjacent planar surface of the base when the supporting and positioning means is contacting the adjacent planar surface, and a second port which is normally open to permit the pressurized fluid which is passing through the passageway to normally exit therefrom; and
    the second port being located on the supporting and positioning means to enable direct selective covering of the second port by a finger of an operator's hand so that the pressurized fluid is forced through the first port to float freely the supporting and positioning means out of contact with the adjacent planar surface of the base on a substantially frictionless fluid film which further permits simultaneous rapid, accurate, linear and rotatable movement of the means by the operator's hand to move the freely floating supporting and positioning means both macroscopic and microscopic distances with respect to a predetermined point without undershooting or overshooting the point whereby the objects are positionable for rapid and microscopic inspection.

2. Apparatus as recited in claim 1, further comprising:
    means movably mounted to the base and between the microscope and such base for picking up and depositing the objects on the supporting and positioning means in accordance with the inspection of such objects with the microscope.

3. Apparatus as recited in claim 2 wherein said means for picking up and depositing the objects has nonglare characteristics.

4. Apparatus as recited in claim 2, further comprising:
    means for limiting the movement of the picking up and depositing means to prevent damage to the objects by said picking up and depositing means.

* * * * *